United States Patent [19]

Bergman

[11] 3,952,920

[45] Apr. 27, 1976

[54] DISPENSER FOR MULTI-COMPONENT PRODUCTS

[75] Inventor: Carl Bergman, Pompano Beach, Fla.

[73] Assignee: Bridgeport Chemical Corporation, Pompano Beach, Fla.

[22] Filed: Dec. 30, 1974

[21] Appl. No.: 537,332

[52] U.S. Cl. .................................. 222/137
[51] Int. Cl.² ............................ B67D 5/52
[58] Field of Search ........... 222/390, 326, 145, 327, 222/137

[56] References Cited
UNITED STATES PATENTS

| | | | |
|---|---|---|---|
| 2,253,151 | 8/1941 | Thompson | 222/390 X |
| 3,117,696 | 1/1964 | Herman et al. | 222/390 X |
| 3,311,265 | 3/1967 | Creighton, Jr. et al. | 222/327 X |
| 3,767,085 | 10/1973 | Cannon et al. | 222/145 X |

Primary Examiner—Stanley H. Tollberg
Assistant Examiner—Norman L. Stack, Jr.
Attorney, Agent, or Firm—Cushman, Darby & Cushman

[57] ABSTRACT

Two dispensing cylinders are secured in side-by-side relation and have pistons whose rods protrude through one end of the cylinders and are yoked together outside the package. A threaded nut is formed in that one end of the package, between the cylinders, and receives a threaded operator. The operator protrudes through an opening in the yoke, which provides a bearing, and is equipped with a handwheel. As the handwheel is turned, the threaded rod is pulled through the nut, consequently advancing both pistons. The threaded rod enters a pocket between the cylinders and the pistons and piston rods are not required to rotate as they are advanced. The package is preferably marked to correlate the amount of product dispensed with the extent of turning of the handwheel.

5 Claims, 2 Drawing Figures

ONE COMPLETE TURN OF HANDLE DISPENSES 10 GRAMS OF COMPONENT A AND 8 GRAMS OF COMPONENT B

DISPENSER FOR MULTI-COMPONENT PRODUCTS

BACKGROUND OF THE INVENTION

Epoxy resin adhesives are typical of multiple component products wherein the components are stored individually and are desirably co-dispensed to ensure correct proportions are available for intermixture. Other products may be usefully stored individually and co-dispensed. Typical of other products is multiple colors of cake icing, which when dispensed together provide a multi-colored ribbon or other design.

During the research which preceded the preparation of this document, the present inventor became aware of the following United States patents which illustrate the background of the invention.

| Patentee | Patent No. | Date of Issue |
|---|---|---|
| Maillard | 2,826,339 | March 11, 1958 |
| Herman et al. | 3,117,696 | January 14, 1964 |
| Van Sciver II | 3,159,312 | December 1, 1964 |
| Nielsen | 3,166,221 | January 19, 1965 |
| Creighton, Jr. et al. | 3,311,265 | March 28, 1967 |
| Creighton, Jr. et al. | 3,323,682 | June 6, 1967 |

In each instance, these patents show two plunger-operated dispensing containers, where the plungers are hand operated in a coordinated manner.

SUMMARY OF THE INVENTION

Two dispensing cylinders are secured in side-by-side relation and have pistons whose rods protrude through one end of the cylinders and are yoked together outside the package. A threaded nut is formed in that one end of the package, between the cylinders, and receives a threaded operator. The operator protrudes through an opening in the yoke, which provides a bearing, and is equipped with a handwheel. As the handwheel is turned, the threaded rod is pulled through the nut, consequently advancing both pistons. The threaded rod enters a pocket between the cylinders and the pistons and piston rods are not required to rotate as they are advanced. The package is preferably marked to correlate the amount of product dispensed with the extent of turning of the handwheel.

Although the largest present market is believed to exist for dispensers for *two* component products, the principles and apparatus of the invention are applicable to dispensers for products having two, three or more separately stored components.

The principles of the invention will be further hereinafter discussed with reference to the drawing wherein a preferred embodiment is intended to exemplify, rather than limit, aspects of the invention as defined in the claims.

DETAILED DESCRIPTION OF THE PRESENTLY PREFERRED EMBODIMENT

Figure 1:
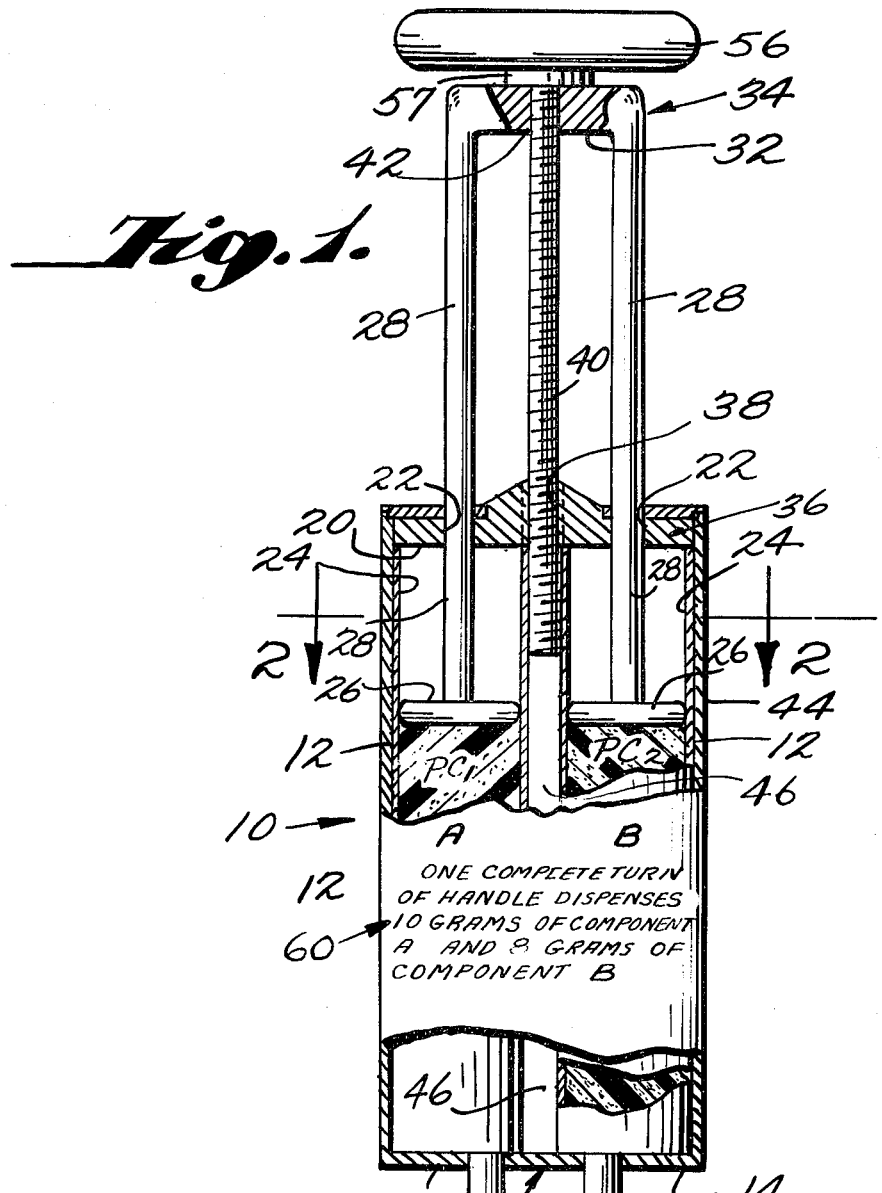
FIG. 1 is a front elevation view of a presently preferred embodiment of the dispenser, with some portions in longitudinal cross-section to expose interior details; and, FIG. 2 is a transverse cross-sectional view thereof, taken on line 2—2 of FIG. 1.
Figure 2:
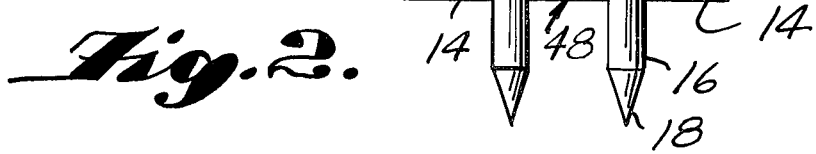
Figure 2:
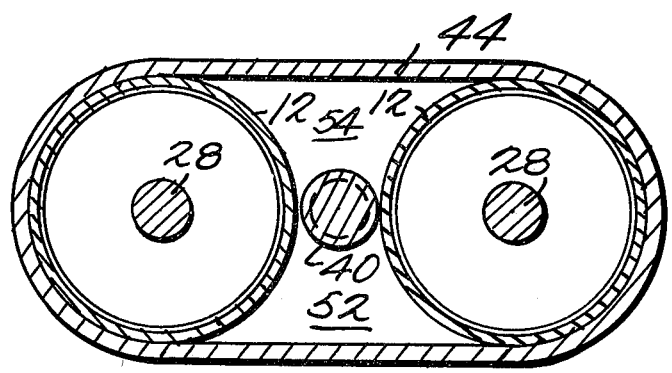

The dispenser package 10 includes a plurality, e.g., two parallel, laterally adjacent, longitudinally extending chambers 12, having one end wall 14 provided with a dispenser spout 16. In the instance depicted, the spouts 16 are of the hollow polyethylene type, which are initially closed at the tapered tips 18. When the dispenser is to be used, the consumer snips off the tips 18. The amount cut off determines the cross-sectional area of of the ribbon of product component which may be extruded therethrough.

The opposite end wall 20 of each chamber 12 is provided with an opening 22.

Within the chambers, the sidewalls 24 provide respective transverse cross-sectional areas of constant size and shape throughout the lengths of the respective chambers, down to the respective spouts 16.

Each chamber 12 is slidingly fitted with a piston 26 which is axially short, but fills the transverse-cross-sectional area of the respective chamber at the level of its disposition. The back of each piston 26 is connected to a piston rod 28 which emerges from the respective chamber through the respective opening 22. The piston rods 28 substantially fill the transverse-cross-sectional areas of the respective openings 22. If the pistons 26 are well gasketed to the sidewalls 24, the openings 22 may be a little oversize with no prospect of product leakage, since in each instance, the product component $PC_1$, $PC_2$ is contained in the chamber between the front 30 of the respective piston and the respective dispenser spout.

Outside the chambers the two piston rods 28 are rigidly joined by a transverse arm 32 to provide a wicket or yoke 34.

It should also be noticed that the chamber end walls 20 are united in an end wall structure 36 which is provided with an interiorly threaded opening 38, e.g., a nut member having a longitudinal axis parallel to those of the piston rods 28. An exteriorly threaded operator 40 is threadably received in the opening 38 and projects backwards through an opening 42 in the transverse arm 32 of the piston rod yoke 34. The opening 42 is shown being unthreaded and oversize so that the operator 40 slips therethrough without driving engagement therewith.

Also in the instance depicted, the two chambers 12 are provided with a common over-wrap 44 so that the operator 40, when threaded into the package, is received in a space 46 defined within the over-wrap 4, outside the chambers 12, but between the end wall structure 36 and the end walls 14. In this example, the end walls 14 are also united in a common end wall structure 48 and the over-wrap 44, to provide and maintain the space 46. With this construction, the piston rods and threaded operator are co-planar, so there is less tendency of the piston to cock when urged forward to dispense product. However, to make the package less bulky, the chambers 12 could be made to touch at 50 and the yoke arm 32 bowed laterally to place the operator 40 in either of the two, generally triangular cross-sectional spaces which would thus be formed between the chambers and the over-wrap at 52, 54. Of course, the packages and pistons could be made of rectangular section, with an area notched from each to provide a longitudinal space for receiving the operator outside the chambers. Such variations as the latter are more theoretical than practical, because of the difficulty and expense of mass manufacture using available equipment.

Rearwardly of the yoke arm 32, a crank arm or handwheel 56 is fixedly secured on the threaded operator 40. Thus, when the operator rotating means 56 is rotated in the sense which threadably advances the operator 40 through the nut 38, the yoke 34 is pulled forwards, respectively advancing both pistons 26 by an equal axial amount.

The element 57 is a ring of plastic bearing material received about the operator between the operating handle 56 and the yoke arm 32.

It should now be apparent that for each unit of angular movement of the operator rotating means 56, correspondingly uniform amounts of product components $PC_1$, $PC_2$ are dispensed from the spouts 16. The amounts dispensed are not dependent on the size of the cuts through the tips 18. This is true even if a user has been careless and has cut off somewhat more from one tip than from the other.

Often the amounts of reactive components of a conventionally packaged epoxy resin or the like which are to be mixed upon being dispensed are *not* equal in volume. In such instances, in order to make metering easier for the consumer, the component needed in lesser volumes is bulked with an extender so the consumer may be instructed to do what is simple: squeeze out equal length (and hopefully equal volume) stripes of each component. It should be apparent that the device 10 of the invention is equally applicable to situations wherein the volumes of product components to be dispensed are equal and to situations where a uniformly greater amount of one component is to be dispensed than of the other. In the latter instance, one chamber and piston is merely made of correspondingly larger diameters than the other. For instance, if one piston and chamber has a cross-sectional area that is 1.2 times larger than the other piston and chamber, each time the member 56 is turned by an increment of any size, 1.2 times the volume of product component will be dispensed from one spout than from the other spout.

Notice that in the preferred embodiment shown in the drawing the spouts 16 are displaced laterally toward one another from the longitudinal center lines of the respective chambers. This is useful in the instance where the package 10 contains components which are to be mixed after they are dispensed (as in the instance of epoxy adhesives) or are to lie closely along side one another (as in the forming of ribbons of multi-colored cake icing). Accordingly, the principles of the invention are broad with respect to the positioning of the spouts on the forward end walls of the package.

As illustrated in FIG. 1, the package 10 may be printed with instructions 60 which may include correlations between the amount of turning of the operator handle 56 and the amount of each component dispensed.

When more than two dispensing chambers are provided in the package, the piston of each is rigidly connected to the arm 32.

It is important that in the construction according to the invention, the components which enter the chambers are not the threaded driving elements, and that the threaded operator is received in a space outside the chambers. Accordingly, the viscousness, reactivity or drying of a component cannot foul one of the threaded driving elements.

In some instances the chambers can be adequately, rigidly connected together by one or both of the end wall structures, so that the over-wrap may be wholly or partially eliminated.

It should now be apparent that dispenser for multi-component products as described hereinabove possesses each of the attributes set forth in the specification under the heading "Summary of the Invention" hereinbefore. Because the dispenser for multi-component products of the invention can be modified to some extent without departing from the principles of the invention as they have been outlined and explained in the specification, the present invention should be understood as encompassing all such modifications as are within the spirit and scope of the following claims.

I claim:

1. A dispenser for multi-component products, comprising:

sidewall means defining a plurality of individual chambers;

means including a unitary end wall member secured to each chamber maintaining the chambers fixed, laterally adjacent relationship as a unitary structure;

one end wall means closing one end of each chamber, each one end wall means including a dispenser spout;

a piston slidingly received in each chamber;

an extrudable product component contained in each chamber between the respective piston and the respective dispenser spout;

a piston rod secured to each piston and projecting out of the opposite end of the respective chamber through said unitary end wall member;

yoke means rigidly interconnecting all the piston rods outside the respective chambers, so that all the piston rods and pistons advance as a unitary structure;

a first threaded element provided on the interconnected piston rod unitary structure;

a second threaded element provided on the unitary structure of said chambers;

the first and second threaded elements being threadably engaged, and only one of the threaded elements being rotatable with respect to the unitary structure upon which it is provided the rotatable threaded element being constituted by an exteriorly threaded, elongated operator journalled in means defining an opening through said arm;

the other one being fixed with respect to the unitary structure upon which it is provided, the nonrotatable threaded element is constituted by an internally threaded nut, so that as threaded element is rotated in one angular sense, the piston rod unitary structure is advanced further into said chambers, thereby dispensing a uniform amount of each product component from each respective spout for each unit of such rotation;

an operating handle secured to the operator for use in rotating the same;

the sidewall means of each chamber being constituted by a respective tubular member and said means secured to each chamber further comprising a common over-wrap of all said tubular members, said operator being received laterally among the exteriors of said tubular members but within the interior of said common over-wrap, whereby both threaded elements are disposed out of contact with the extrudable product components contained in the chambers of said dispenser.

2. The dispenser of claim 1, wherein the yoke is constituted by an arm which extends laterally between two piston rods; wherein the rotatable threaded element is constituted by an exteriorly threaded, elongated operator journalled in means defining an opening through said arm; further including an operating handle secured to the operator for use in rotating the same; and wherein the non-rotatable threaded element is constituted by an internally threaded nut.

3. The dispenser of claim 2 wherein said means secured to each chamber comprises a unitary end wall member of the two chambers corresponding to said two piston rods, said nut being provided on said unitary end wall member.

4. The dispenser of claim 2 wherein the sidewall means is constituted by two tubular members and wherein said means secured to each chamber comprises a common over-wrap of both tubular members, said operator being received laterally between the exterior of said two tubular members and the interior of said common over-wrap.

5. The dispenser of claim 4 further including indicia provided on the over-wrap equating the amount of rotation of said operating handle in a sense to advance the pistons with the amount of product components respectively consequently dispensed from said spouts.

* * * * *